United States Patent [19]
Obara

[11] Patent Number: 4,882,464
[45] Date of Patent: Nov. 21, 1989

[54] ELECTRICAL DISCHARGE MACHINING EQUIPMENT

[75] Inventor: Haruki Obara, Kanagawa, Japan

[73] Assignee: Fanuc Ltd, Minamitsuru, Japan

[21] Appl. No.: 251,216

[22] PCT Filed: Nov. 18, 1987

[86] PCT No.: PCT/JP87/00892
§ 371 Date: Oct. 5, 1988
§ 102(e) Date: Oct. 5, 1988

[87] PCT Pub. No.: WO88/04211
PCT Pub. Date: Jun. 16, 1988

[30] Foreign Application Priority Data
Dec. 11, 1986 [JP] Japan ................ 61-293551

[51] Int. Cl.$^4$ .............................................. B23H 1/02
[52] U.S. Cl. ................................................... 219/69.13
[58] Field of Search ............... 219/69.13, 69.16, 69.18, 219/69.19

[56] References Cited
U.S. PATENT DOCUMENTS
4,590,353  5/1983  Obara et al. .................. 219/69.19

FOREIGN PATENT DOCUMENTS
180719  9/1985  Japan .......................... 219/69.13
125721  6/1986  Japan .

Primary Examiner—A. D. Pellinen
Assistant Examiner—Geoffrey S. Evans
Attorney, Agent, or Firm—Staas & Halsey

[57] ABSTRACT

An electrical discharge machining apparatus compensates for an inductance fall component and a resistance fall component in a sensed machining gap voltage. The inductance fall component is determined by a current variation rate sensed by an instrument current transformer. The resistance fall component is sensed by a resistor, an integrator, or a combination of a second instrument current transformer and an ingegrator. The sensed gap voltage is then compensated for the resistance fall component and the inductance fall component.

7 Claims, 2 Drawing Sheets

ELECTRICAL DISCHARGE MACHINING EQUIPMENT

BACKGROUND OF THE INVENTION

1. Field of the Invention

This invention relates to an improvement applicable to electrical discharge machining equipment. More specifically, this invention relates to an improvement applicable to means for sensing the voltage across the gap in which electrical discharges occur for electrical discharge machining.

2. Description of the Related Art

It is required to maintain the geometrical length of the gap across which electrical discharges occur for electrical discharge machining at a constant value, for the purpose of maintaining a stable intensity for an electric current flowing in the gap for electrical discharge machining. To satisfy this requirement, it is essential to employ means for sensing the voltage across the gap in which electrical discharges occur for electrical discharge machining (Hereinafter referred to as the electric discharge machining gap voltage sensing means).

Presented below will be a description of electrical discharge machining equipment described paying particular attention to electric discharge machining gap voltage sensing means.

Referring to FIG. 1, a machining electrode 1 can be a rod electrode (which is employed in electrical discharge machining equipment for producing a recess), as shown in the drawing, or a wire electrode (not shown but employable in wire electrode type electrical discharge machining). A gap 12 in which electric discharges occur (hereinafter referred to as a machining gap) is maintained between the machining electrode 1 and a workpiece 2 to allow electric discharges to occur therein. Means 3 for generating a high frequency pulse wave electric voltage is allowed to select variable wave forms. An instrument current transformer 4 or the like is designed to sense the variation rate of electric current. In the equipment illustrated in FIG. 1, the transformer 4 is actually employed as a means for sensing an inductance fall component. An electric discharge machining gap voltage is sensed at a point 5, at which point the circuit of the high frequency pulse wave electric voltage generating means 3 is connected to the rod machining electrode 1, in the case of electrical discharge machining for producing a recess in the workpiece 2. On the other hand, an electric discharge machining gap voltage is sensed by means of electric feeder means or the like (not shown), in the case of wire electrode type electrical discharge machining, in which a wire electrode is employed.

An electric discharge machining gap voltage sensed at any of the points described above contains not only the genuine value of the electric discharge machining gap voltage but also error voltage components. The error voltage components include an inductance fall component and a resistance fall component which occur between the machining electrode 1 and the electric discharge machining gap voltage sensing point 5. The error voltage components also include an inductance fall component and a resistance fall component which occur between the workpiece 2 and the other electric discharge machining gap voltage sensing point (which is not shown in the drawing, but is one terminal of the instrument current transformer 4 or the ground point in this example). Particularly in the case of wire electrode type electrical discharge machining equipment, the inductance fall component is so large that the inductance fall component cannot be ignored. Therefore, it is required to sense the error voltage components and to subtract the voltage amount from the voltage between the two points at which an electric discharge machining gap voltage is sensed (between one end of the machining electrode 1 and the ground point in this embodiment), for the purpose of correcting the apparent electric discharge machining gap voltage sensed in the manner described above and to obtain the correct or true electric discharge machining gap voltage which is actually applied across the electrical discharge machining gap.

Means for removing the influence of the aforementioned error voltage components can be realized by employing a principle that the inductance fall component accounting for the major portion of the error voltage components is proportional to the variation rate of an electric current. Therefore, electrical discharge machining equipment available in the prior art is provided which electric discharge machining gap voltage correcting means 6 which functions to subtract the inductance fall component, which is determined following the output signal of the electric current variation rate sensing means 4 such as an instrument current transformer or the like, from the apparent electric discharge machining gap voltage (the voltage difference between the potential at one end of the machining electrode 1 and the ground potential, in this example) sensed in the aforementioned manner. The electric discharge machining gap voltage correcting means 6 is inherently an adder. The apparent electric discharge machining gap voltage (the voltage difference between the potential at one end of the machining electrode 1 and the ground potential, in this example) sensed in the aforementioned manner is applied to a first element 61. The output signal of the electric current variation rate sensing means 4 is applied to a second element 62 of the correcting means 6. Since the output signal of the electric current variation rate sensing means 4 is a negative value, the electric discharge machining gap voltage correcting means 6 actually performs subtraction.

Adjustment of the second element 62 is readily possible by adjusting the output signal of the electric discharge machining gap voltage correcting means 6 to 0 (zero). This is accomplished by short-circuiting the machining gap 12 and applying a high frequency pulse voltage between the point 5 and one end of the instrument current transformer 4.

Although the electric discharge machining gap voltage correcting means 6 is remarkably effective to remove the harmful effects of the inductance fall component, the harmful effects of the resistance fall component can not be ignored, particularly in the case where a thin wire electrode or a tungsten wire electrode is employed.

SUMMARY OF THE INVENTION

For such cases where the harmful effects of the resistance fall component can not be ignored, there is a need for more accurate electric discharge machining gap voltage sensing means which are further provided with means for correcting the error caused by the resistance fall component.

The object of this invention is to satisfy the aforementioned requirement and to provide electrical discharge machining equipment provided with more accurate electric discharge machining gap voltage sensing means, the voltage sensing means being further provided with means for removing the error caused by the resistance fall component.

An electrical discharge machining apparatus for machining a workpiece provided with electric discharge machining gap voltage sensing means in accordance with the first embodiment of this invention is an electrical discharge machining apparatus provided with a machining electrode (1), a high frequency pulse voltage generating means (3) for supplying high frequency voltage pulses across a machining gap (12) remaining between the machining electrode (1) and the workpiece (2) to be machined, a means (4) for sensing the variation rate of the electric current which flows through the machining gap (12), and a means (6) for correcting the electric discharge machining gap voltage by subtracting the inductance fall component which is determined following the electric current variation rate sensed by means of the electric current variation rate sensing means (4), from the electric discharge maching gap voltage representing the voltage difference sensed across the machining gap (12). The electrical discharge machining equipment is further provided with a machining current resistance fall component sensing means (7) for sensing the intensity of the electric current flowing in the machining gap (12), and the electric discharge machining gap voltage correcting means (6) being further provided an element (63) for subtracting the machining current resistance fall component sensed by the machining current resistance fall component sensing means (7), from the electric discharge machining gap voltage representing the voltage difference sensed across the machining gap (12).

An electrical discharge machining apparatus provided with an electric discharge machining gap voltage sensing means in accordance with the second embodiment of this invention is an electrical discharge machining apparatus provided with a machining electrode (1), a high frequency pulse voltage generating means (3) for supplying high frequency voltage pulses across a machining gap (12) which remains between the machining electrode (1) and a workpiece (2) to be machined, a means (4) for sensing the variation rate of the electric current which flows through the machining gap (12), and a means (6) for correcting the electric discharge machining gap voltage by subtracting an inductance fall component which is determined following the electric current variation rate sensed by means of the electric current variation rate sensing means (4), from the electric discharge machining gap voltage representing the voltage difference sensed across the machining gap (12). The electric current variation rate sensing means (4) is further provided with an integrator (8) for integrating the electric current variation rate sensed by the electric current variation rate sensing means (4) to determine a machining current fall component, and the electric discharge machining gap voltage correcting means (6) is further provided with an element (63) for subtracting the machining current resistance fall component determined by the integrator (8).

An electrical discharge machining apparatus provided with an electric discharge machining gap voltage sensing means in accordance with the third embodiment of this invention is an electrical discharge machining apparatus provided with an machining electrode (1), a high frequency pulse voltage generating means (3) for supplying high frequency voltage pulses across the machining gap (12), which remains between the machining electrode (1) and a workpiece (2) to be machined, a means (4) for sensing the variation rate of the electric current which flows through the machining gap (12), and a means (6) for correcting the electric discharge machining gap voltage by subtracting the inductance fall component, which is determined following the electric current variation rate sensed by means of the electric current variation rate sensing means (4), from the electric discharge machining gap voltage representing the voltage difference sensed across the machining gap (12). The electric current variation rate sensing means (4) is further provided with a second electric current variation rate sensing means (9) and an integrator (8) for integrating the electric current variation rate sensed by the second electric current variation rate sensing means (9), and the electric discharge machining gap voltage correcting means (6) is further provided an element (63) for subtracting the machining current resistance fall component determined by the integrator (8).

BRIEF DESCRIPTION OF THE DRAWINGS

A more detailed description will be presented below for three embodiments of electrical discharge machining equipment in accordance with this invention, referring to the drawings described below

DESCRIPTION OF PREFERRED EMBODIMENTS

First Embodiment

Figure 1:
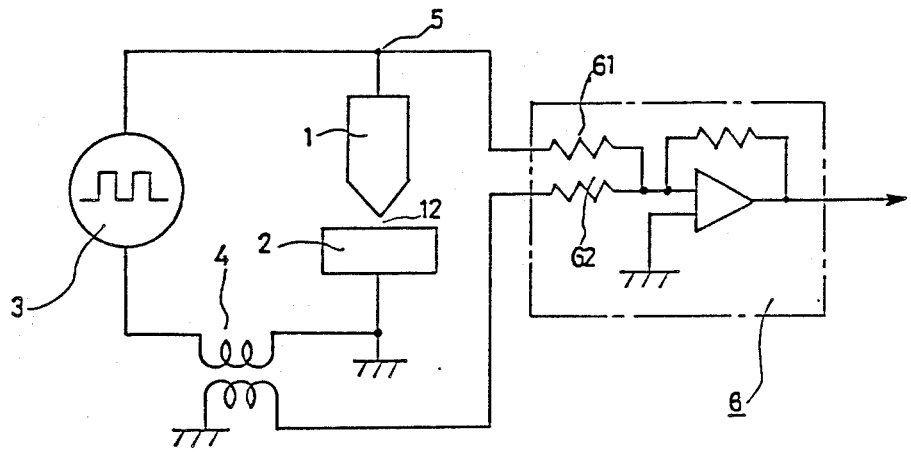
FIG. 1 is a schematic drawing of prior art electrical discharge machining equipment provided with electrical discharge machining gap voltage sensing means.
Figure 2:
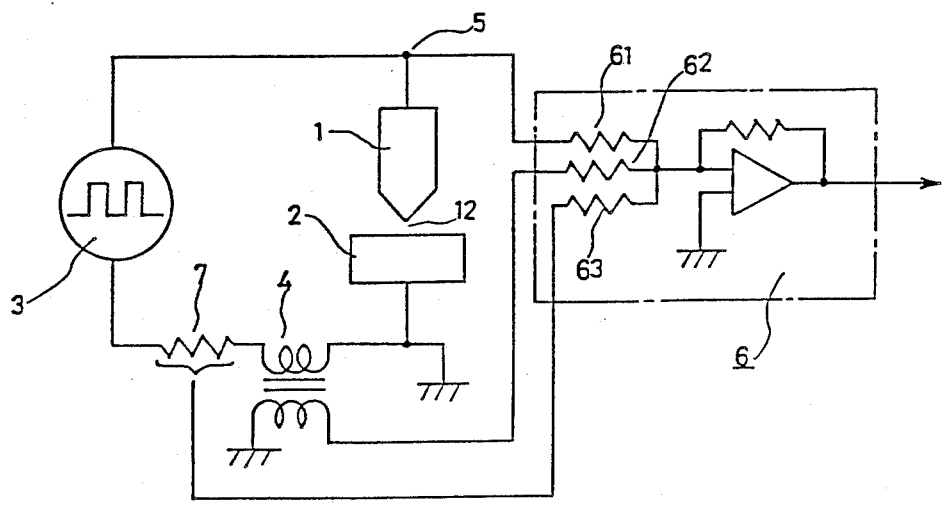
FIG. 2 is a schematic drawing of electrical discharge machining equipment provided with electrical discharge machining gap voltage sensing means in accordance with a first embodiment of this invention.
Figure 3:
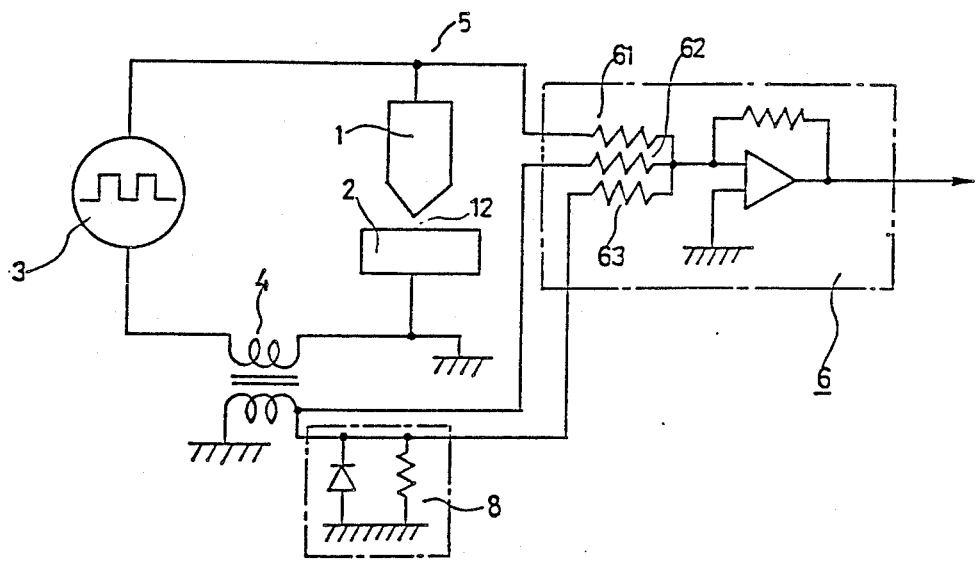
FIG. 3 is a schematic drawing of electrical discharge machining equipment provided with electrical discharge machining gap voltage sensing means in accordance with a second embodiment of this invention.
Figure 4:
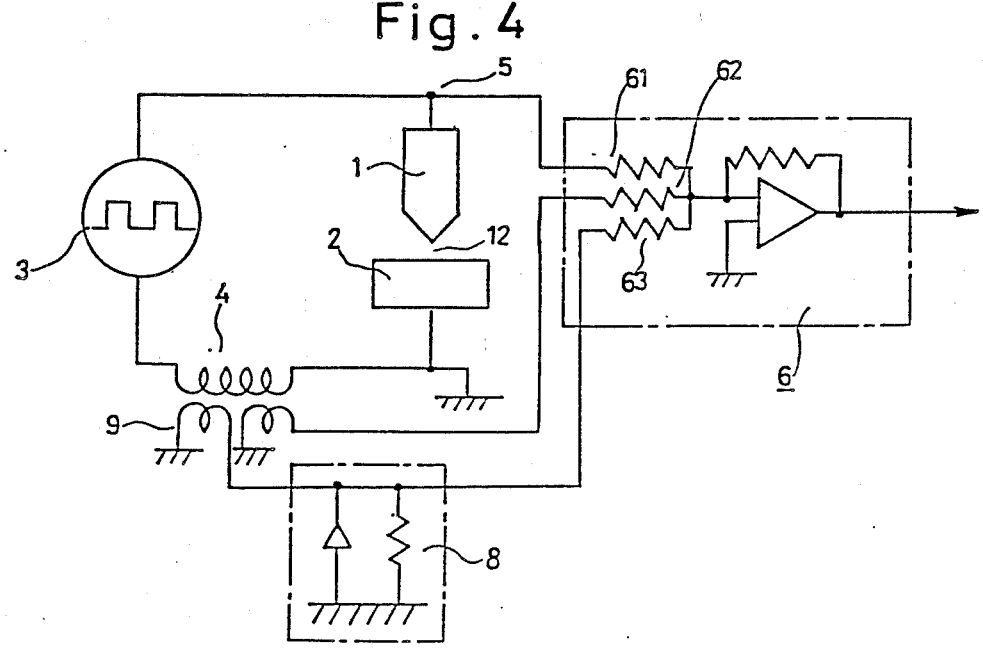
FIG. 4 is a schematic drawing of electrical discharge machining equipment provided with electrical discharge machining gap voltage sensing means in accordance with a third embodiment of this invention.

Referring to FIG. 2, a machining electrode 1 can be a rod electrode (which is employed with electrical discharge machining equipment for producing a recess in a workpiece 2), as shown in the drawing, or a wire electrode (not shown, but employed for wire electrode type electrical discharge machining). A gap 12, in which electric discharges occur, is maintained between the machining electrode 1 and the workpiece 2 to allow electric discharges occur therebetween. Means 3 for generating a high frequency pulse wave electric voltage is allowed to select variable wave forms. An instrument current transformer 4 or the like is designed to sense the variation rate of electric current. The transformer 4 is actually employed as a means for sensing an inductance fall component. An electric discharge machining gap voltage is sensed at a point 5, at which point the circuit of the high frequency pulse wave electric voltage generating means 3 is connected to the rod machining electrode 1, in the case of electrical discharge machining for producing a recess in the workpiece 2. On the other hand, an electric discharge machining gap voltage is sensed by means of an electric feeder means or the like (not shown), in the case of wire electrode type electrical discharge machining.

A resistor 7 is the resistance fall component sensing means. This resistor 7 is essential for the electrical discharge machining equipment in accordance with the first embodiment of this invention. The electric discharge machining gap voltage correcting means 6 is inherently an adder. The apparent electric discharge machining gap voltage sensed in the aforementioned manner is applied to a first element 61 thereof, and an output signal of the electric current variation rate sensing means 4, which represents the inductance fall component, is applied to a second element 62 thereof. An output signal of the resistance fall component sensing means 7 to a third element 63 of the correcting means 6. Both the inductance fall component and the resistance fall component are subtracted from the apparent electric discharge machining gap voltage. In this way, the apparent electric discharge machining gap voltage is corrected to a signal having a value representing the true electric discharge machining gap voltage.

Adjustment of the second and third elements 62 and 63 is readily possible by adjusting the output signal of the electric discharge machining gap voltage correcting means 6 to 0 (zero), under the conditions that the machining gap is short-circuited and a high frequency pulse voltage is applied between the point 5 and one end of the resistor 7.

Second Embodiment

The difference between this embodiment and the first embodiment is that the resistor 7, which acts as the resistance fall component sensing means in the first embodiment, is replaced by an integrator 8, which integrates the output signal of the instrument current transformer 4 (the electric current variation rate sensing means which acts as the inductance fall sensing means). This is based on a principle that since both inductance and resistance are originated from a circuit element (a wire), and since the resistance of a wire is proportional to the inductance of the wire, integration of an inductance fall becomes equivalent to a resistance fall.

In the same manner as is in the aforementioned embodiment, adjustment of the second and third elements 62 and 63 is readily possible by adjusting the output signal of the electric discharge machining gap voltage correcting means 6 to 0 (zero), under the conditions that the machining gap is short-circuited and a high frequency pulse voltage is applied between the point 5 and one end of the instrument current transformer 4.

Third Embodiment

The difference between this embodiment and the first embodiment is similar to the difference between the first embodiment and the second embodiment. In the second embodiment, the resistor 7 of FIG. 2, which acts as the resistance fall component sensing means in the first embodiment, is replaced by an integrator 8, which integrates an output signal of the instrument current transformer 4 (the electric current variation rate sensing means which acts as the inductance fall sensing means). On the other hand, the difference between this embodiment and the second embodiment is that an independent second electric current variation rate sensing means 9, such as an independent instrument current transformer, is also provided, in addition to the integrator 8.

The basic principle on which this third embodiment functions is similar to that on which the second embodiment functions. In other words, since both inductance and resistance are originated from a circuit element (a wire) and since the resistance of a wire is proportional to the inductance of the wire, integration of an inductance fall is equivalent to a resistance fall. In this third embodiment, however, an independent instrument current transformer 9 acting as an electric current variaton rate sensing means is particularly effective to improve the accuracy of the correction of the electric discharge machining gap voltage.

The adjustment of the second and third elements 62 and 63 is possible in the same manner as was described above for the first embodiment.

The three embodiments of the aforementioned electrical discharge machining equipment are provided with electric discharge machining gap voltage sensing means in accordance with this invention and are provided with electric discharge machining gap voltage correcting means The correcting means not only subtract the inductance fall component, which is determined following the electric current variation rate signal sensed by the electric current variation rate sensing means (for example, an instrument current transformer), from the apparent electric discharge machining gap voltage sensed across the machining gap, but also substract the resistance fall component, which is sensed by the resistance fall component sensing means (for example, a resistor). Accordingly, correction is realized not only for the error caused by the inductance fall component, but also for the error caused by the resistance fall component , resultantly enabling the electrical discharge machining equipment to sense an accurate value of electric discharge machining gap voltage.

The foregoing description has clarified that this invention has successfully provided electrical discharge machining equipment which provides more accurate electric discharge machining gap voltage sensing means, which is provided with correcting means for the error caused not only by the inductance fall component but also by the resistance fall component.

Although this invention has been described with reference to specific embodiments, this description is not meant to be construed in a limiting sense. Various other embodiments and/or modifications of this invention will become apparent to persons skilled in the art upon reference to the description of this invention. It is therefore contemplated that the claims will cover any such embodiments and/or modifications as fall within the true scope of this invention.

I claim:

1. An electrical discharge machining apparatus for machining a workpiece, comprising:
   a machining electrode;
   electric discharge gap voltage sensing means for sensing a gap voltage across a machining gap between said machining electrode and the workpiece;
   high frequency pulse voltage generating means for supplying high frequency voltage pulses across the machining gap;
   electric current variation rate sensing means for determining an inductance fall component by sensing an electric current variation rate across the machining gap;
   machining current resistance fall component sensing means for determining a resistance fall component by sensing the intensity of the electric current flowing in the machining gap; and correcting means for correcting the sensed gap voltage by compensating for the inductance fall component and the resistance fall component.

2. An electrical discharge machining apparatus according to claim 1, wherein said machining electrode is a wire electrode and said electric discharge gap voltage sensing means comprises an electric feeder.

3. An electrical discharge machining apparatus according to claim 1, wherein said resistance fall component sensing means is a resistor.

4. An electrical discharge machining apparatus for machining a workpiece, comprising:

a machining electrode;

electric discharge gap voltage sensing means for sensing a gap voltage across a machining gap between said machining electrode and the workpiece;

high frequency pulse voltage generating means for supplying high frequency voltage pulses across the machining gap;

electric current variation rate sensing means for detecting an inductance fall component by sensing an electric current variation rate across the machining gap;

machining current resistance fall component sensing means for sensing a resistance fall component from the electric current variation rate; and correcting means for correcting the sensed gap voltage by compensating for the inductance fall component and the resistance fall component.

5. An electrical discharge machining apparatus according to claim 4, wherein said machining current resistance fall component sensing means comprise integrating means for integrating the electric current variation rate to obtain the resistance fall component.

6. An electrical discharge machining apparatus for machining a workpiece, comprising:

a machining electrode;

electric discharge gap voltage sensing means for sensing a gap voltage across a machining gap between said machining electrode and the workpiece;

high frequency pulse voltage generating means for supplying high frequency voltage pulses across the machining gap;

first electric current variation rate sensing means for detecting an inductance fall component by sensing an electric current variation rate across the machining gap;

second electric current variation rate sensing means for sensing the electric current variation rate;

integrating means for integrating the electric current variation rate sensed by said second electric current variation rate sensing means to obtain a machining current resistance fall component; and correcting means for correcting the sensed gap voltage by compensating for the inductance fall component and the resistance fall component.

7. An electrical discharge machining apparatus according to claim 6, wherein said first and second electric current variation rate sensing means comprise first and second instrument current transformers, respectively.

* * * * *